Aug. 27, 1968 R. A. FOREST, JR 3,399,316
VIBRATING-REED TYPE ELECTRIC INSTRUMENT WITH BUILT-UP
FIELD AND COIL SUPPORT
Filed Jan. 25, 1966
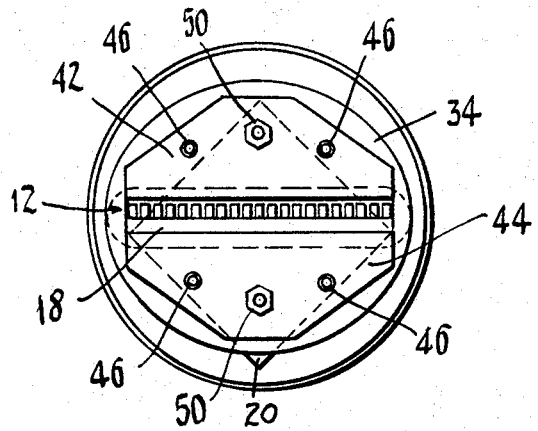
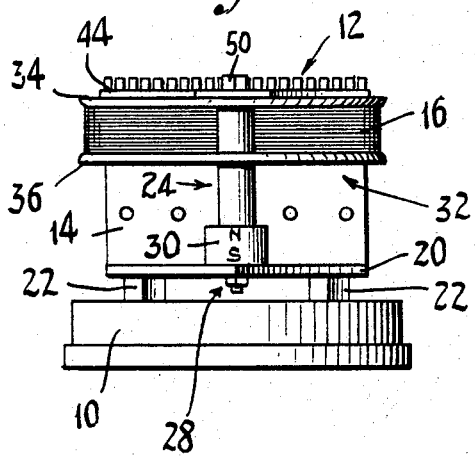
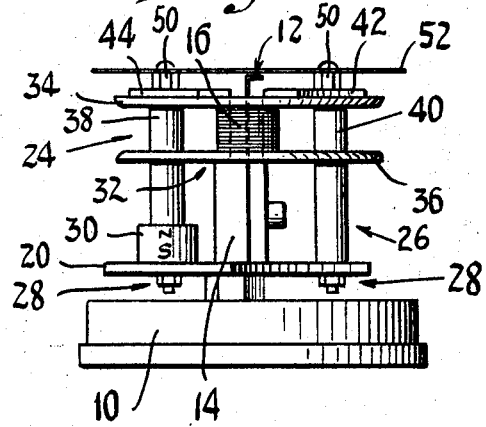
INVENTOR.
Raoul A. Forest, Jr
BY
AGENT

United States Patent Office 3,399,316
Patented Aug. 27, 1968

3,399,316
VIBRATING-REED TYPE ELECTRIC INSTRUMENT WITH BUILT-UP FIELD AND COIL SUPPORT
Raoul A. Forest, Jr., New Haven, Conn., assignor to J-B-T Instruments, Inc., New Haven, Conn., a corporation of Connecticut
Filed Jan. 25, 1966, Ser. No. 522,883
4 Claims. (Cl. 310—25)

This invention relates to electric instruments of the vibrating reed type, and more particularly to built-up field magnet and coil support systems of such instruments.

Objects of the invention are to provide a novel reed-type instrument with improved composite or multi-part built-up magnetic field and coil-support structure; an instrument of this kind which has a widely distributed yet effective field flux through the use of especially simple, economical-to-fabricate components which can be easily and quickly assembled whereby manufacturing costs are low; and an instrument having all of the above attributes and which is still rugged in construction, and efficient and reliable in its operation.

Other features and advantages will hereinafter appear.

In the drawings:

FIG. 1 is a front elevational view of an instrument movement of the kind identified, embodying the invention. The showing is without a dial and casing.

FIG. 2 is a bottom plan view of the instrument movement of FIG. 1, and

FIG. 3 is a side elevational view of the instrument movement, with a dial added.

In the drawings, the instrument movement is shown as being mounted on a circular casing back plate 10, which may be part of a cylindrical casing (not shown) of any usual type. A row of vibratable reeds 12 is shown, mounted on a supporting reed block 14 of known type. Surrounding the row of reeds 12 is an exciting or driving coil 16 having an elongate or slot-shaped air core 18, all in the usual manner.

In accordance with the present invention there is provided a novel and improved composite or multi-part, built-up magnetic field and coil support structure which is cooperable with the reeds 12 to provide a widely distributed yet effective field flux through the use of especially simple, economical-to-fabricate components of the type capable of being easily and quickly assembled whereby the manufacturing cost is held to a minimum figure. At the same time, the said magnetic field and coil support structure is rugged in construction, efficient and reliable in its operation.

As shown, a flat metal base plate 20 of magnetic material such as soft steel, iron or the like is provided, mounted on the back plate 10 by means of a pair of sturdy non-magnetic posts 22. The base plate 20 may have various configurations, being shown in FIG. 1 as roughly of diamond-like shape.

Carried by the base plate 20 are two parallel, magnetic posts 24 and 26 disposed with one end each in abutting relation to spaced-apart areas of the base plate. The posts 24, 26 have bores, and are secured together and to the said base plates 20 by draft elements such as screws or threaded stems 28 and suitable nuts. Further, the magnetic post 24 includes an annular permanent magnet 30 which is magnetized with north and south poles at opposite ends of its axis, said permanent magnet effecting a magnetic flux through the posts 24, 26 and also the base plate 20.

The exciting coil 16 is wound on a bobbin designated generally by the numeral 32, said bobbin having relatively large end plates 34, 36 through which the posts 24, 26 and draft elements 28 pass. It will be seen from an inspection of FIGS. 2 and 3 that portions of the posts are disposed in the space which extends between the end plates 34 and 36, and surrounds the exciting coil 16. The said portions are designated 38, 40 respectively.

Further, in accordance with the invention, a pair of substantially flat sheet metal pole pieces 42, 44 is provided, secured to the free ends of the magnetic posts 24, 26 by the draft elements 28, and arranged to overlie the end plate 34 of the bobbin 32. The said bobbin end plate 34 is fastened to the pole pieces 42, 44 by suitable rivets 46, as indicated in FIG. 1. It will be understood that the end plates 34, 36 of the bobbin have clearance holes through which the magnetic posts 24, 26 pass, in extending to the pole pieces 42, 44.

By such construction, the bobbin 32 and coil 16 carried thereby are supported on and behind the pole pieces 42, 44, in operative relation to the row of reeds 12. The annular permanent magnet 30 abuts the base plate 20 whereby the one pole thereof provides a strong magnetic flux which permeates the said base plate. The strength or coercive force of the permanent magnet 30 is sufficiently great to enable the magnet to be of relatively small size, and as seen in FIGS. 2 and 3 it is substantially of less length than the overall length of the post 24, and is specifically less than one-half the said overall length.

The reed mounting block 14 is secured to the magnetic base plate 20 and extends upward into close proximity to the coil 16 in cases where the reeds 12 are of high frequency and relatively short length. For lower frequencies, the mounting block 14 may be of lesser height when viewed as in FIG. 3, whereby it is spaced from the bobbin 32.

Short threaded posts 50 are mounted on the pole pieces 42, 44 as by being secured to the threaded elements 28 at the upper ends thereof, considering FIG. 3. Secured to the posts 50 is a suitable dial 52, having a slot through which the reeds 12 extend.

The above construction of magnetic field and coil supporting structure is characterized by extreme simplicity of the component parts, together with a desirable rigidity and ruggedness. Further, the construction has flexibility in that it may be readily dismantled if required, for servicing, replacement, etc. The parts are of simple configuration, and may be economically fabricated by known manufacturing techniques. The coil 16 and bobbin 32 are rigidly supported and immovable with respect to the pole pieces 42, 44, and the entire assemblage has been found to constitute an effective means for supplying a widely distributed magnetic flux for the reeds 12, in close proximity to one end of the coil 16 whereby effective frequency response of the reeds 12 is had. The improved results are accompanied by a desirably low fabrication cost.

Variations and modifications may be made within the scope of the claims, and portions of the improvement may be used without others.

I claim:

1. A vibrating-reed type electric instrument comprising, in combination:
    (a) a set of vibratable reeds disposed in a row,
    (b) an exciting coil surrounding said reeds, and
    (c) a combined field and coil supporting structure, said structure including a magnetic circuit having an air gap in which the reeds are disposed, and further comprising:
        (1) a substantially flat magnetic base plate of sheet metal,
        (2) a pair of parallel magnetic posts disposed with one end each in abutting relation to spaced-apart areas of the base plate,
        (3) an annular permanent magnet which is magnetized with north and south poles at opposite ends of its axis, said magnet being included in one of said posts to effect a flux through the posts and base plate, (4) said posts having bores and being secured together and to said base plate by draft elements passing through the posts and plate, (5) a bobbin on which the coil is wound, having end plates through which said posts and draft elements pass, portions of said posts being disposed in the space extending between said end plates, and (6) a pair of substantially flat sheet metal pole pieces secured broadside to the free ends of the magnetic posts and arranged to overlie one end plate of the bobbin, (7) said one end plate being secured to said pole pieces and both end plates having clearance holes through which the magnetic posts extend, (8) said bobbin and coil being supported by said pole pieces.

2. A vibrating-reed type electric instrument as in claim 1, wherein:

(a) the annular permanent magnet abuts said base plate and supplies flux directly thereto.

3. A vibrating-reed type electric instrument as in claim 2, wherein:

(a) the annular permanent magnet constitutes less than one-half the length of the post in which it is included.

4. A vibrating-reed type electric instrument as in claim 3, wherein:

(a) a casing back plate is provided,
(b) said base plate being mounted on said back plate,
(c) said set of reeds being mounted on the base plate,
(d) studs mounted on the pole pieces, and
(e) a dial secured to said studs.

References Cited

UNITED STATES PATENTS

| | | | |
|---|---|---|---|
| 2,681,588 | 6/1954 | Dyner | 84—456 |
| 2,916,700 | 12/1959 | Daschke | 324—80 |
| 2,958,040 | 10/1960 | Daschke et al. | 324—80 |
| 3,079,555 | 2/1963 | Daschke | 324—80 |
| 3,173,088 | 3/1965 | Umile et al. | 324—80 |

FOREIGN PATENTS 868,470  2/1953  Germany.

MILTON O. HIRSHFIELD, *Primary Examiner.*

D. F. DUGGAN, *Assistant Examiner.*